United States Patent
Sharma

(10) Patent No.: US 10,334,017 B2
(45) Date of Patent: Jun. 25, 2019

(54) TRACKING A STATUS OF A FILE TRANSFER USING FEEDBACK FILES CORRESPONDING TO FILE TRANSFER EVENTS

(71) Applicant: Accenture Global Solutions Limited, Dublin (IE)

(72) Inventor: Sumit Sharma, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 230 days.

(21) Appl. No.: 14/974,274

(22) Filed: Dec. 18, 2015

(65) Prior Publication Data
US 2017/0180454 A1 Jun. 22, 2017

(51) Int. Cl.
| | | |
|---|---|---|
| H04L 29/08 | (2006.01) | |
| G06F 16/182 | (2019.01) | |
| G06F 11/30 | (2006.01) | |
| G06F 11/32 | (2006.01) | |

(52) U.S. Cl.
CPC .......... *H04L 67/06* (2013.01); *G06F 11/3006* (2013.01); *G06F 11/3055* (2013.01); *G06F 16/183* (2019.01); *H04L 67/22* (2013.01); *H04L 67/28* (2013.01); *H04L 67/327* (2013.01); *G06F 11/324* (2013.01); *G06F 2201/835* (2013.01); *G06F 2201/86* (2013.01)

(58) Field of Classification Search
CPC ............. H04L 63/1416; H04L 63/1425; H04L 63/1408; H04L 63/121; H04L 63/20; H04L 43/062
See application file for complete search history.

(56) References Cited

U.S. PATENT DOCUMENTS

| | | | | |
|---|---|---|---|---|
| 5,862,335 A | * | 1/1999 | Welch, Jr. ............... | H04L 29/06 709/224 |
| 9,516,053 B1 | * | 12/2016 | Muddu ................. | G06F 16/254 |
| 2005/0237221 A1 | * | 10/2005 | Brian ...................... | H04Q 9/00 340/870.02 |
| 2007/0133412 A1 | * | 6/2007 | Hutter .................... | H04L 12/14 370/235 |

(Continued)

FOREIGN PATENT DOCUMENTS

| | | |
|---|---|---|
| JP | 2002007 197 | 11/2002 |
| WO | 2014/066803 | 5/2014 |

OTHER PUBLICATIONS

Extended European Search Report corresponding to EP 16 20 2974.8, dated May 4, 2017, 8 pages.

*Primary Examiner* — Barbara B Anyan
(74) *Attorney, Agent, or Firm* — Harrity & Harrity, LLP

(57) ABSTRACT

A device may receive a set of feedback files associated with a file transfer from a first device to a second device. A feedback file, of the set of feedback files, may include a timestamp corresponding to an event associated with the file transfer. The device may determine configuration information associated with the file transfer. The configuration information may include timing information, associated with the event, that identifies an expected time associated with the event. The device may determine status information associated with the file transfer. The status information may be determined based on the timestamp corresponding to the event and the timing information associated with the event. The device may provide the status information.

20 Claims, 9 Drawing Sheets

(56) References Cited

U.S. PATENT DOCUMENTS

2009/0327361 A1 12/2009 Mills et al.
2013/0125228 A1* 5/2013 Do .......................... G06F 21/33
                                                            726/9
2016/0344729 A1* 11/2016 Slaight ................. H04L 63/061

* cited by examiner

TRACKING A STATUS OF A FILE TRANSFER USING FEEDBACK FILES CORRESPONDING TO FILE TRANSFER EVENTS

BACKGROUND

Tracking and/or monitoring a status of a file transfer (e.g., including one or more files) from a source device to a target device may be part of an information technology service management (ITSM) process associated with planning, delivering, operating and/or control IT services.

SUMMARY

According to some possible implementations, a method may include: receiving, by a device, a set of feedback files associated with a file transfer from a first device to a second device, where a feedback file, of the set of feedback files, may include a timestamp corresponding to an event associated with the file transfer; determining, by the device, configuration information associated with the file transfer, where the configuration information may include timing information, associated with the event, that identifies an expected time associated with the event; determining, by the device, status information associated with the file transfer, where the status information may be determined based on the timestamp corresponding to the event and the timing information associated with the event; and providing, by the device, the status information.

According to some possible implementations, a device may include one or more processors to: receive a plurality of feedback files associated with a file transfer from a first device to a second device, where a first feedback file, of the plurality of feedback files, may include a first timestamp corresponding to a first event associated with the file transfer, and where a second feedback file, of the plurality of feedback files, may include a second timestamp corresponding to a second event associated with the file transfer; receive configuration information associated with the file transfer, where the configuration information may include information that identifies timing information associated with the first event and timing information associated with the second event; determine a status of the file transfer based on the first timestamp and the first timing information or the second timestamp and the second timing information; and provide information associated with the status of the file transfer.

According to some possible implementations, a non-transitory computer-readable medium may store one or more instructions that, when executed by one or more processors, cause the one or more processors to: receive, from a first device, a first set of feedback files associated with a file transfer from the first device to a second device, where a feedback file, of the first set of feedback files, may identify a time associated with a first event during the file transfer; receive, from the second device, a second set of feedback files associated with the file transfer from the first device to the second device, where a feedback file, of the second set of feedback files, may identify a time associated with a second event during the file transfer; determine configuration information, associated with the file transfer, that includes a first expected time window, associated with the first event, and a second expected time window associated with the second event; determine status information associated with the file transfer, where the status information may be determined based on the time associated with the first event and the first expected time window, or where the status information may be determined based on the time associated with the second event and the second expected time window; and provide the status information for display to a user.

DETAILED DESCRIPTION

Figure 1A:
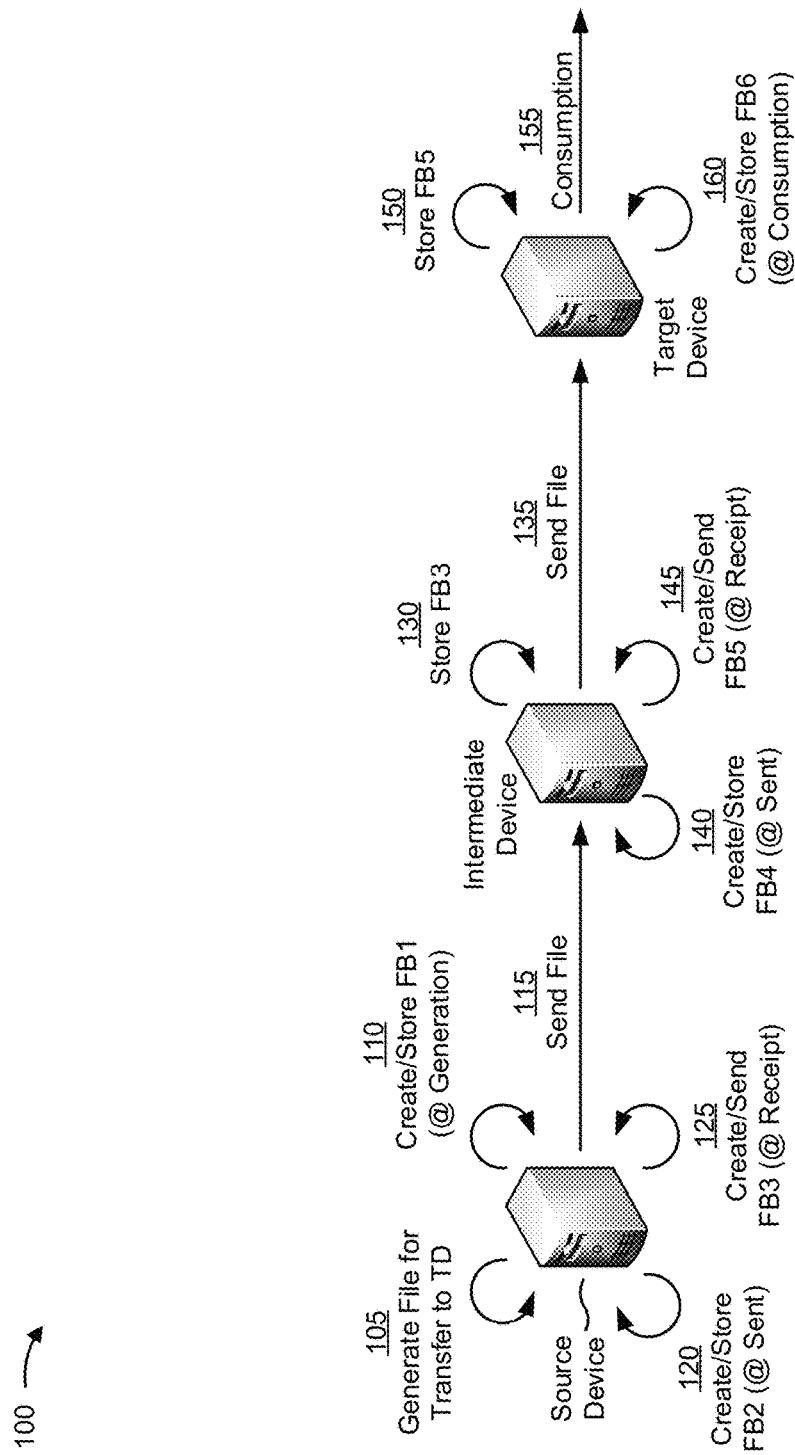
FIGS. 1A and 1B are diagrams of an overview of an example implementation described herein.

The following detailed description of example implementations refers to the accompanying drawings. The same reference numbers in different drawings may identify the same or similar elements.

An ITSM process may include tracking a status of a file transfer associated with sending a set of files from a source device to a target device. However, the status of the file transfer (e.g., an overall status, a status of each file, etc.) may be difficult to determine when the set of files is transferred via one or more devices that are not accessible by an interested party (e.g., an ITSM team associated with monitoring the status of the file transfer). For example, when the one or more devices are operated and/or managed by different entities, the status of the file transfer may be determined only when information, associated with the status of the file transfer with respect to each device, is provided by the entities that operate and/or manage the one or more devices.

Moreover, gathering and/or determining the information associated with the status of the file transfer may be resource intensive and/or time consuming (e.g., as the number of files increases) when the status of each of the set of files is reported separately, such as via confirmation messages (e.g., e-mails, text messages, etc.) indicating that the file has been sent from and/or received by a particular device. This difficulty may be compounded when reporting of the status of each file and/or determining the status of the file transfer is performed manually (e.g., by sorting through and reviewing the confirmation messages associated with each file).

Implementations described herein may allow a tracking server to determine a status of a file transfer (e.g., across multiple devices) using a set of feedback files, corresponding to each file associated with the file transfer, that are automatically (e.g., without user intervention) created during the file transfer. In some implementations, use of the feedback files may allow the tracking server to determine the status of the file transfer automatically and/or in real-time (or near real-time) during the file transfer. In some implementations, the status information associated with file transfer may be used to generate reporting information associated with system performance, file transfer trends, or the like.

Implementations described herein may also allow the tracking server to provide information associated with the status of the file transfer such that the status information is accessible even when the multiple devices via which the file transfer occurs are operated and/or managed by separate entities.

Additionally, the embodiments described herein represent an advancement to a conventional computer and/or a conventional communications network. For example, a computer that uses these embodiments may be capable of determining whether a data is dropped, lost, misrouted, or the like, when sent from to the computer from another device. These embodiments may use an independent device to inform the computer that the data is lost, dropped, misrouted, or the like, and/or may allow the data to be provided the computer to inform the computer that the computer did not receive the data. These embodiments also make a communications network more reliable and efficient since feedback information can be provided to any device in the communications network, if desired.

Figure 1B:
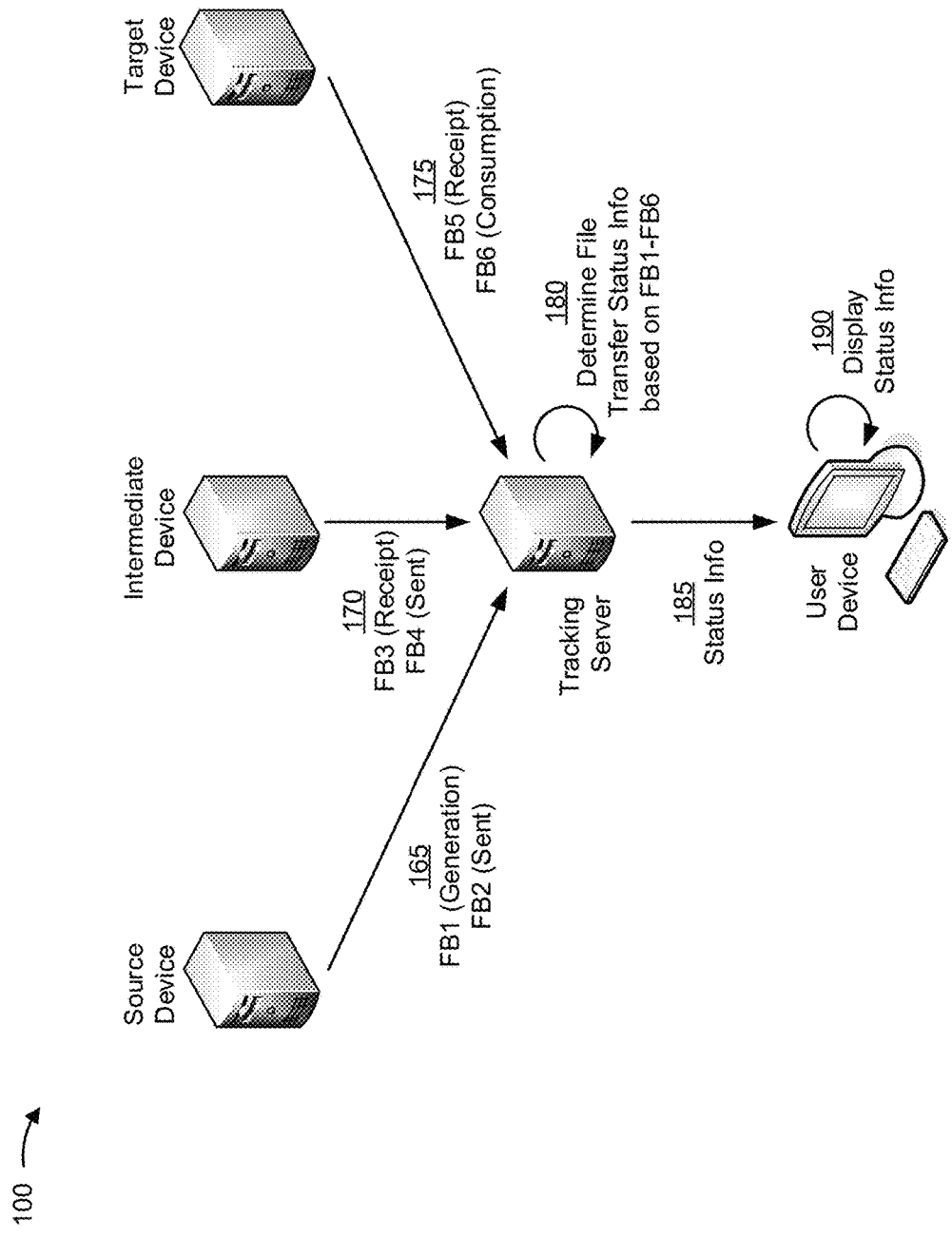

FIGS. 1A and 1B are diagrams of an overview of an example implementation 100 described herein. For the purposes of example implementation 100, assume that a file is to be transferred from a source device to a target device via an intermediate device (e.g., a device positioned along a path between the source device and the target device). Further, assume that each device stores or has access to configuration information that identifies a manner in which the file is to be transferred from the source device to the target device (e.g., including path information, timing information, etc.).

Finally, assume that each device is configured to generate one or more feedback files, associated with tracking a status of the file transfer. In some implementations, the feedback file may correspond to an event associated with the file transfer, such as an identification event (e.g., when the file is generated and identified for transfer, when the file is received and identified for transfer, etc.), a sent event (e.g., when the file is sent), a receipt event (e.g., when the file is received), a consumption event (e.g., when the file is loaded, opened, stored, etc.), or the like.

As shown in FIG. 1A, and by reference number 105, the source device may generate the file (e.g., based on the configuration information) that is to be transferred to the target device. As shown by reference number 110, based on generating the file, the source device may create and store a first feedback file (e.g., FB1). The first feedback file may include a timestamp associated with the generation of the file by the source device, information that identifies the device associated with the event (e.g., the source device), information that identifies the file, information that identifies the event (e.g., generation), or the like.

As shown by reference number 115, after generating the file, the source device may send the file to the intermediate device (e.g., in accordance with the configuration information). As shown by reference number 120, based on sending the file to the intermediate device, the source device may create and store a second feedback file (e.g., FB2). The second feedback file may include a timestamp associated with the sending of the file by the source device, information that identifies the device associated with the event (e.g., the source device), the information that identifies the file, information that identifies the event (e.g., sent), or the like.

As shown by reference number 125, based on determining that the file has been received by the intermediate device, the source device may create a third feedback file (e.g., FB3). The third feedback file may include a timestamp associated with the receipt of the file by the intermediate device, information that identifies the device associated with the event (e.g., the intermediate device), the information that identifies the file, information that identifies the event (e.g., receipt), or the like. As shown, the source device may send the third feedback file to the intermediate device. In some implementations, the source device may create and send the third feedback file (e.g., rather than the intermediate device creating the third feedback file based on receiving the file) in order to allow the status of the file transfer to be accurately tracked, as described in further detail below.

As shown by reference number 130, the intermediate device may receive and store the third feedback file. As shown by reference number 135, after receiving the file, the intermediate device may send the file to the target device (e.g., in accordance with the configuration information).

As shown by reference number 140, based on sending the file to the target device, the intermediate device may create and store a fourth feedback file (e.g., FB4). The fourth feedback file may include a timestamp associated with the sending of the file by the intermediate device, information that identifies the device associated with the event (e.g., the intermediate device), the information that identifies the file, information that identifies the event (e.g., sent), or the like.

As shown by reference number 145, based on determining that the file has been received by target device, the intermediate device may create a fifth feedback file (e.g., FB5). The fifth feedback file may include a timestamp associated with the receipt of the file by the target device, the information that identifies the file, information that identifies the device associated with the event (e.g., the target device), information that identifies the event (e.g., receipt), or the like. As shown, the intermediate device may send the fifth feedback file to the target device. In some implementations, the intermediate device may create and send the fifth feedback file in order to allow the status of the file transfer to be accurately tracked, as described in further detail below.

As shown by reference number 150, the target device may receive and store the fifth feedback file. As shown by reference number 155, after receiving the file, the target device may provide the file for consumption (e.g., such that the file may be loaded, opened, stored, forwarded, etc.). As shown by reference number 160, based on providing the file for consumption, the target device may create and store a sixth feedback file (e.g., FB6). The sixth feedback file may include a timestamp associated with the consumption of the file, information that identifies the device associated with the event (e.g., the target device), the information that identifies the file, information that identifies the event (e.g., consumption), or the like.

As shown in FIG. 1B, and by reference number 165, the source device may provide (e.g., automatically, based on user input, etc.) the first feedback file and the second feedback file to a tracking server associated with tracking a status of the file transfer. As shown by reference number 170, the intermediate device may provide the third feedback file and the fourth feedback file to the tracking server. As shown by reference number 175, the target device may provide the fifth feedback file and the sixth feedback file to the tracking server. In some implementations, the source device, the intermediate device, and/or the target device may provide the respective feedback files during the file transfer (e.g., in real-time or near real-time when the feedback files are created and/or stored).

As shown by reference number 180, the tracking server device may determine, based on the set of feedback files received from the source device, the intermediate device, and the target device, status information associated with the file transfer. The status information may include information associated with a status of the file transfer. For example, the status information may include information indicating that the file transfer has not started (e.g., that the file has not been generated), is waiting (e.g., that the file has been generated but not sent), is in-progress (e.g., that the file has been sent by the source device but not yet received by the target device), is complete (e.g., that the file has been provided for consumption by the target device), has failed (e.g., when an event, associated with the file transfer, did not take place during an expected time window, when the file transfer has experienced an error, etc.). In some implementations, the tracking server may determine the status information based on the set of feedback files, associated with the file transfer, and the configuration information associated with the file transfer. For example, if the configuration information includes timing information associated with the file transfer (e.g., information that identifies one or more time windows by which one or more file transfer events are to take place), then the tracking server may determine the status information by comparing timestamps included in the feedback files and the timing information. In some implementations, the tracking server may determine the status information in real-time or near real-time (e.g., as the file transfer takes place).

As shown by reference number 185, the tracking server may provide the status information to a user device. As shown by reference number 190, the user device may provide the status information for display to a user. Here, the user need not be associated with an entity that operates and/or manages the source device, the intermediate device, or the target device (e.g., the user need only be authorized to view the status information via the tracking server).

In this way, a tracking server may determine a status of a file transfer (e.g., across multiple devices) using a set of feedback files, corresponding to each file associated with the file transfer, that are automatically (e.g., without user intervention) created during the file transfer.

Further, the tracking server may provide information associated with the status of the file transfer such that the status information is accessible even when the multiple devices via which the file transfer occurs are operated and/or managed by separate entities.

Figure 2:
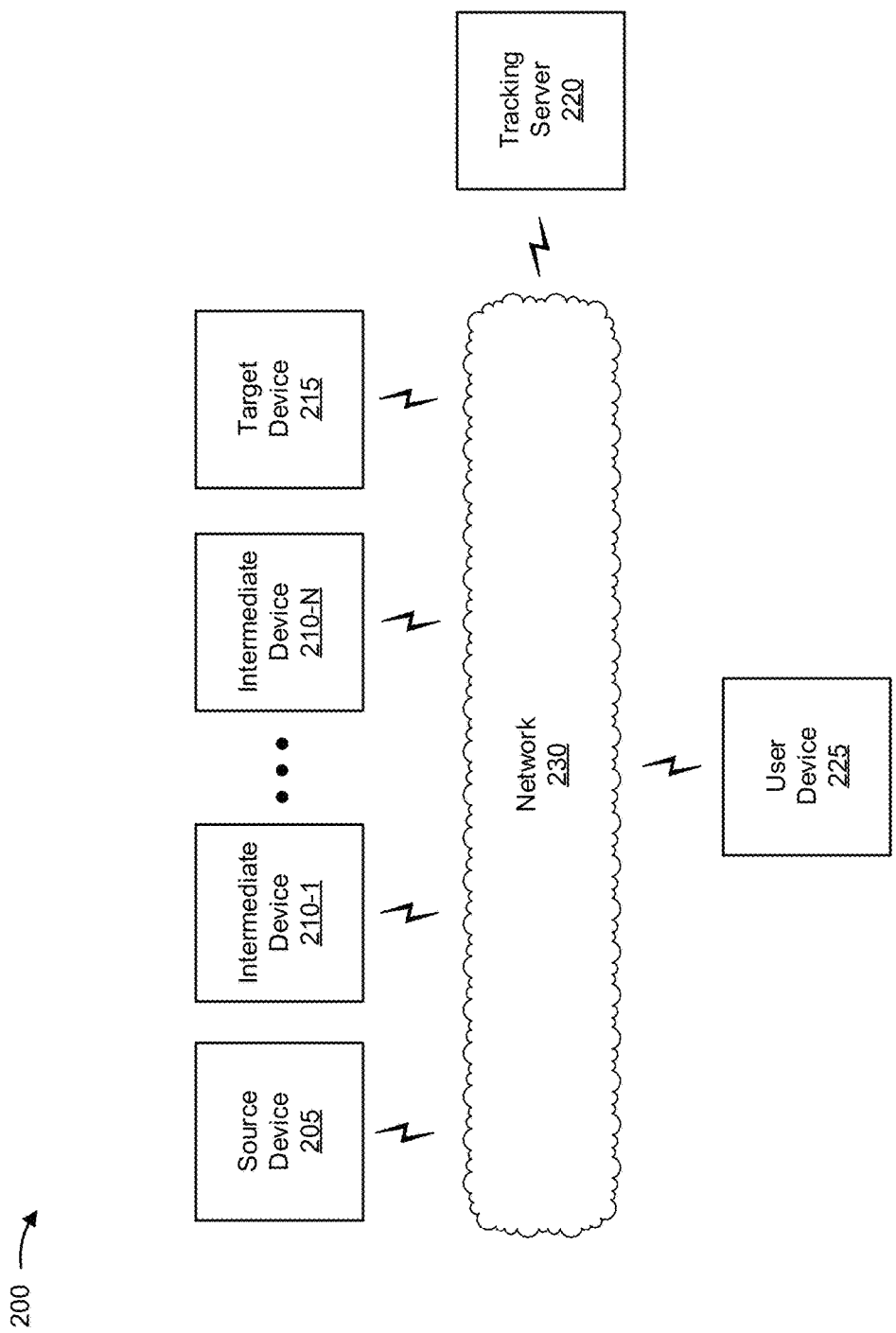
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a source device 205, one or more intermediate devices 210-1 through 210-N(N≥1) (hereinafter referred to collectively as intermediate devices 210, and individually as intermediate device 210), a target device 215, a network 220, a tracking server 225, and a user device 230. Devices of environment 200 may interconnect via wired connections, wireless connections, or a combination of wired and wireless connections.

Source device 205 may include a device capable of sending a set of files associated with a file transfer from source device 205 to target device 215, and/or creating, sending, and/or storing a first set of feedback files associated with tracking a status of the file transfer. For example, source device 205 may include a server or a group of servers. In some implementations, source device 205 may be positioned such that the file transfer starts at source device 205 (i.e., the files may be originally sent from source device 205).

Intermediate device 210 may include a device capable of receiving and forwarding a set of files associated with a file transfer between source device 205 and target device 215, and/or creating, sending, and/or storing a second set of feedback files associated with tracking the status of the file transfer. For example, intermediate device 210 may include a server, a group of servers, a network device, such as a router, a switch, a gateway, or the like. In some implementations, intermediate device 210 may be positioned such that the set of files is transferred via intermediate device 210 (i.e., intermediate device 210 may be positioned between source device 205 and target device 215).

Target device 215 may include a device capable of receiving, storing, and/or providing a set of files associated with a file transfer from source device 205 to target device 215, and/or creating and/or storing a third set of feedback files associated with tracking the status of the file transfer. For example, target device 215 may include a server or a group of servers. In some implementations, target device 215 may be positioned such that the file transfer ends at target device 215.

Network 220 may include one or more wired and/or wireless networks. For example, network 220 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Tracking server 225 may include a device capable of receiving, determining, processing, storing, and/or providing status information associated with a status of a file transfer between source device 205 to target device 215. For example, tracking server 225 may include a server or a group of servers. In some implementations, tracking server 225 may be capable of receiving feedback files, associated with the file transfer, from source device 205, intermediate devices 210, and/or target device 215. Additionally, or alternatively, tracking server 225 may be capable of determining the status information based on the feedback files associated with the file transfer.

User device 230 may include one or more devices capable of receiving and/or providing status information, associated with a file transfer between source device 205 and target device 215, such that the status information may be displayed for viewing by a user. For example, user device 230 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
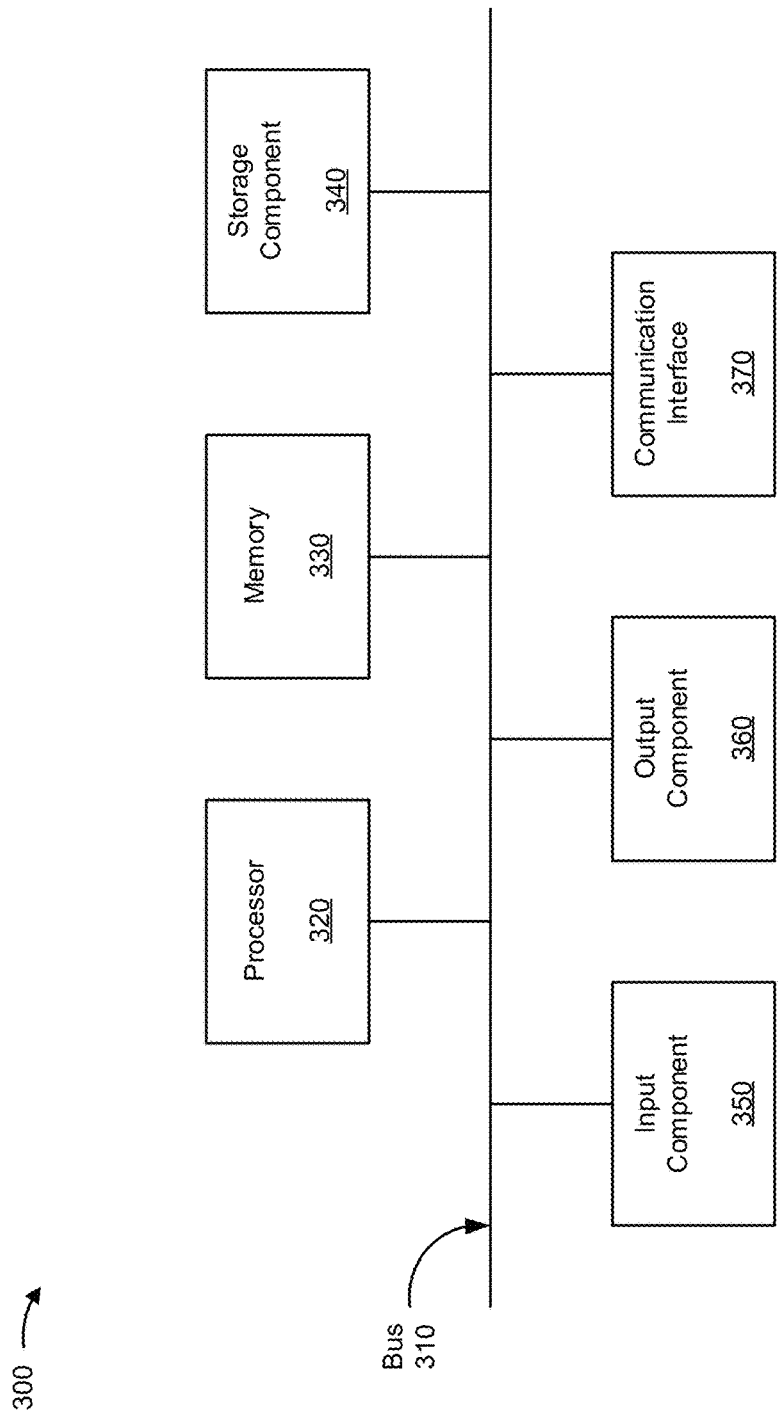
FIG. 3 is a diagram of example components of one or more devices of FIG. 2.

FIG. 3 is a diagram of example components of a device 300. Device 300 may correspond to source device 205, intermediate device 210, target device 215, tracking server 225, and/or user device 230. In some implementations, source device 205, intermediate device 210, target device 215, tracking server 225, and/or user device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A non-transitory computer-readable medium is defined herein as a non-transitory memory device. A memory device includes memory space within a single physical storage device or memory space spread across multiple physical storage devices.

Software instructions may be read into memory 330 and/or storage component 340 from another non-transitory computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
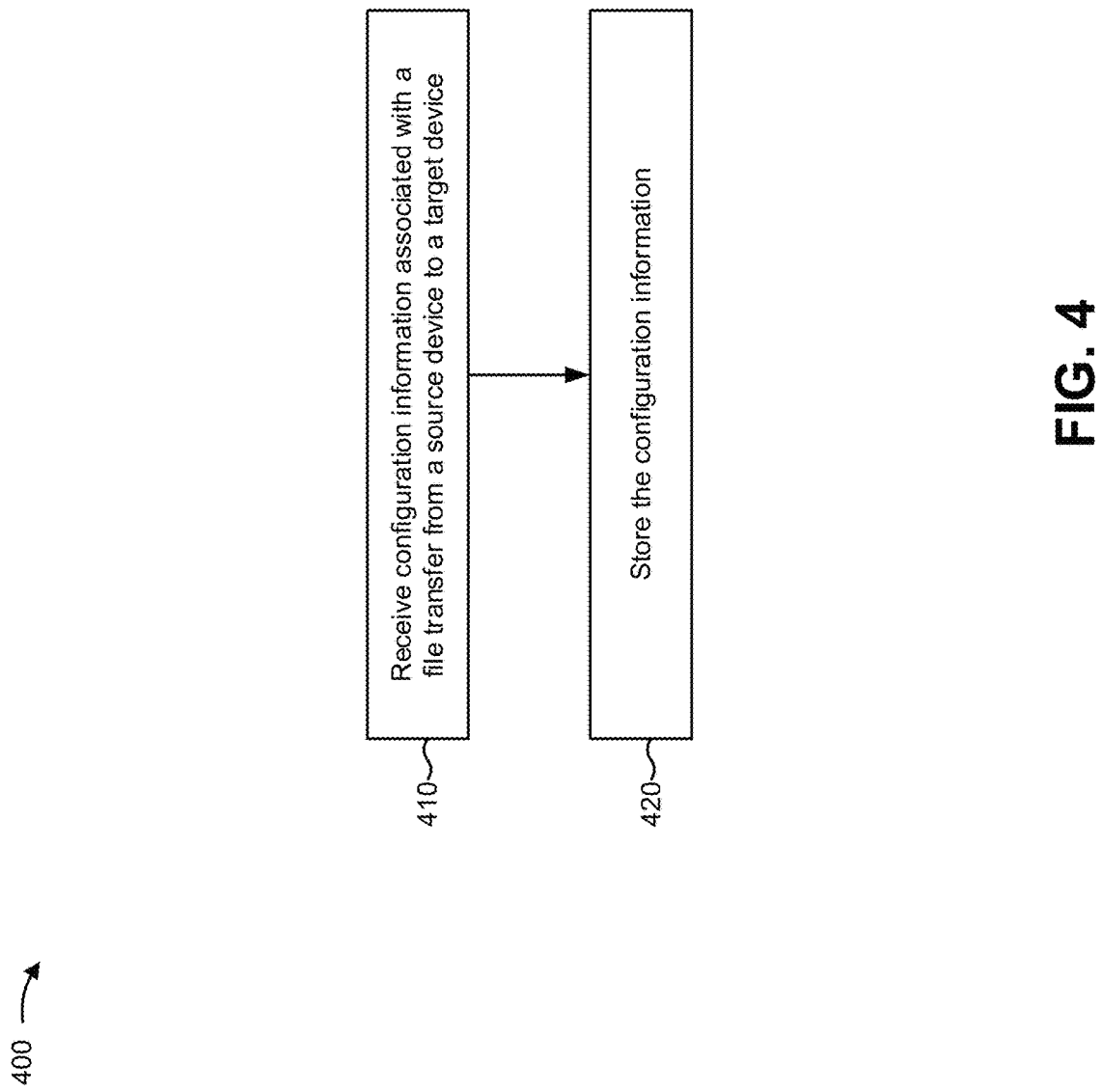
FIG. 4 is a flow chart of an example process for receiving and storing configuration information associated with a file transfer from a source device to a target device.

FIG. 4 is a flow chart of an example process 400 for receiving and storing configuration information associated with a file transfer from a source device to a target device. In some implementations, one or more process blocks of FIG. 4 may be performed by tracking server 225. In some implementations, one or more process blocks of FIG. 4 may be performed by another device or a group of devices separate from or including tracking server 225, such as source device 205, intermediate device 210, target device 215, or another device of environment 200.

As shown in FIG. 4, process 400 may include receiving configuration information associated with a file transfer from a source device to a target device (block 410). For example, tracking server 225 may receive configuration information associated with a file transfer from source device 205 to target device 215. In some implementations, tracking server 225 may receive the configuration information when a user provides (e.g., via user device 230) input associated with the configuration information. Additionally, or alternatively, tracking server 225 may receive the configuration information when another device provides the configuration information, such as source device 205, one or more intermediate devices 210, or target device 215.

In some implementations, the configuration information may include information associated with a set of files to be transferred from source device 205 to target device 215. For example, the configuration information may include information that identifies a set of files associated with the file transfer, such as names of one or more files, a name of a group of files, a list of file names, an application identifier associated with the set of files, a host system identifier associated with the set of files, a device identifier associated with the set of files, or the like.

In some implementations, the file transfer may be configured on a file level. For example, the configuration information may identify one or more files or groups of files that are to be transferred. Additionally, or alternatively, the file transfer may be configured on an application level. For example, the configuration information may indicate that files associated with a particular application are to be transferred. Additionally, or alternatively, the file transfer may be configured on a host system level. For example, the configuration information may indicate that files associated with one or more applications operating on a host system and/or files accessible by the host system are to be transferred.

In some implementations, the configuration information may include a schedule based on which the set of files is to be generated. For example, source device 205 may be capable of generating a file (e.g., associated with an application, associated with a host system, etc.). Here, the configuration information may include information indicating when source device 205 is to generate the file, such as a date, a day of the week, a time, an interval of time (e.g., every one week, every 10 hours, etc.), or the like. In some implementations, the configuration information may identify a time by which the file generation is expected to start (i.e., a file generation start time), a time by which generation of the file is expected to be complete (i.e., a file generation end time), or the like. In other words, the configuration information may identify a time window for generation of the file.

In some implementations, the configuration information may include a schedule based on which the set of files is to be received (e.g., from another device such that the file may be transferred to target device 215). For example, the configuration information may include information indicating when source device 205 is expected to receive the file, such as a date, a day of the week, a time, an interval of time, or the like. In some implementations, the configuration information may identify a time window during which receipt of the file by source device 205 is expected.

As an additional example, the configuration information may include a schedule based on which the set of files is to be transferred, such as a date, a day of the week, a time of day, a frequency, or the like. In some implementations, the configuration information may including timing information associated with transferring the file. For example, the configuration information may identify a time window (e.g., a start time and an end time) during which the file is expected to be sent (herein referred to as a file sent time window) (e.g., between one minute and five minutes after the file is generated or identified, etc.), a time window during which the file is expected to be received (herein referred to as a file sent time window) (e.g., between five minutes and ten minutes after the file is generated, within one minute of the file being sent, etc.), or the like.

In some implementations, the configuration information may include a file sent time window and a file received time window for each device along a path associated with the file transfer. For example, the configuration information may include a first file sent time window that identifies a time window during which the file is expected to be sent by source device 205. Here, the configuration information may also include a first file received time window (e.g., a time window after the first file sent time window) that identifies a time window during which the file is expected to be received by intermediate device 210. The configuration information may further include a second file sent time window (e.g., a time window after the first file received time window) that identifies a time window during which the file is expected to be sent by intermediate device 210. Here, the configuration information may also include a second file received time window (e.g., a time window after the second file sent time window) that identifies a time window during which the file is expected to be received by target device 215.

As another example, the configuration information may include a schedule based on which the set of files is to be consumed (e.g., loaded, opened, stored, forwarded and/or otherwise provided by target device 215 for use in a host system, an application, etc.). Here, the configuration information may include information indicating when target device 215 is to consume the file, such as a date, a day of the week, a time, an interval of time (e.g., every one week, every 10 hours, etc.), or the like. In some implementations, the configuration information may identify a time by which consumption of the file is expected to start (i.e., a file consumption start time), a time by which consumption of the file is expected to be complete (i.e., a file consumption end time), or the like. In other words, the configuration information may identify a time window for consumption of the file.

Additionally, or alternatively, the configuration information may include information associated with one or more devices associated with the file transfer. For example, the configuration information may include a device identifier (e.g., a device name, a device identification number, a etc.) and/or network address (e.g., an Internet protocol (IP) address, a media access control (MAC) address, etc.) of source device 205 from which the set of files is to be transferred, a first intermediate device 210 via which the set of files is to be transferred, a second intermediate device 210 via which the set of files are to be transferred, target device 215 to which the set of files are to be transferred, or the like. In other words, in some implementations, the configuration information may include information that identifies a path via which the set of files is to be transferred.

In some implementations, the configuration information may include information that identifies (e.g., a name, a description, etc.) one or more applications, hosted by the one or more devices on the file transfer path, via which the file transfer is to take place. For example, the configuration information may include information that identifies (e.g., a name, a description, etc.) a first application, hosted by source device 205, from which the set of files are to be transferred. Here, the configuration information may include information that identifies a second application, hosted by intermediate device 210, via which the set of files is to be transferred. Continuing this example, the configuration information may also include information that identifies a third application, hosted by target device 215, to which the set of files is to be provided.

Additionally, or alternatively, the configuration information may include information that identifies one or more hosts system (e.g., a UNIX system, a LINUX system, a Windows system, etc.) associated with the file transfer. Additionally, or alternatively, the configuration information may include information that identifies a protocol to be used for the file transfer, such as network data mover (NDM), file transfer protocol (FTP), secure FTP (SFTP), or the like.

Additionally, or alternatively, the configuration information may include access information associated with tracking the status of the file transfer. For example, the configuration information may include information that identifies users authorized to view status information associated with the file transfer, such as a name, a username, an account number, a user identification number, or the like. As another example the configuration information may include information that identifies user devices 230 to which the status information, associated with the file transfer, may be provided (e.g., for viewing by a user), such as a device name, a device identification number, a network address, or the like.

As further shown in FIG. 4, process 400 may include storing the configuration information (block 420). For example, tracking server 225 may store the configuration information. In some implementations, tracking server 225 may store the configuration information after tracking server 225 receives the configuration information. Additionally, or alternatively, tracking server 225 may store the configuration information when tracking server 225 receives information indicating that tracking server 225 is to store the configuration information from another device.

In some implementations, tracking server 225 may store the configuration information in a memory location (e.g., a RAM, a ROM, a cache, a hard disk, etc.) of tracking server 225. In some implementations, tracking server 225 may store information associated with the configuration information such that previous configuration information (e.g., configuration information received by tracking server 225 at an earlier time) is supplemented, modified, overwritten, deleted, or the like. Additionally, or alternatively, tracking server 225 may store the configuration information such that tracking server 225 may retrieve the configuration information at a later time.

In some implementations, tracking server 225 may provide the configuration information to another device for storage and/or use. For example, tracking server 225 may provide the configuration information to source device 205, intermediate devices 210, and/or target device 215 (e.g., identified in the configuration information) for storage and/or use in carrying out the file transfer at a later time. Here, source device 205, intermediate device 210 and/or target device 215 may store the configuration information such that the file transfer may take place in accordance with the configuration information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
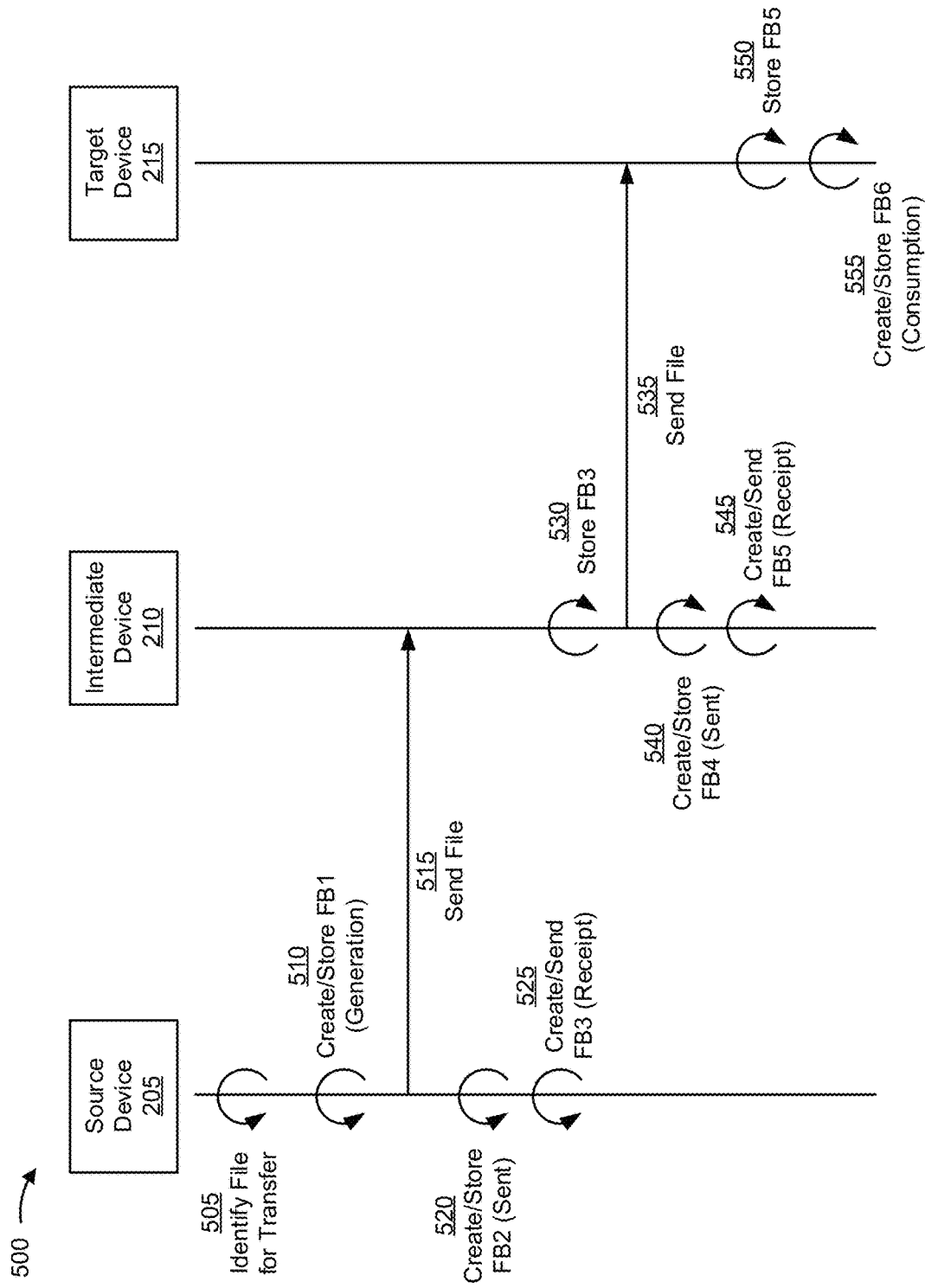
FIG. 5 is a call flow diagram of an example process for creating, providing, and storing feedback files associated with determining a status of a file transfer from a source device to a target device.

FIG. 5 is a call flow diagram of an example process 500 for creating, providing, and storing feedback files associated with determining a status of a file transfer from a source device to a target device. In some implementations, one or more process steps of FIG. 5 may be performed by source device 205, intermediate device 210, and target device 215. In some implementations, one or more process steps of FIG. 5 may be performed by another device, such as another device of environment 200.

As shown in FIG. 5, process 500 may include identifying a file to be transferred from a source device to a target device (step 505). For example, source device 205 may identify a file to be transferred from source device 205 to target device 215. In some implementations, source device 205 may identify the file when source device 205 receives an indication to identify the file, based on configuration information associated with a file transfer including the file, as described below.

In some implementations, source device 205 may identify the file to be transferred based on configuration information associated with a file transfer. For example, the configuration information may include information that identifies one or more files to be transferred from source device 205 to target device 215 (e.g., via one or more intermediate devices 210) based on a schedule identified in the configuration information. Here, source device 205 may identify the file based on the configuration information that identifies the one or more files. As another example, the configuration information may include information that identifies an application for which a set of files, associated with the application, are to be transferred from source device 205 to target device 215 (e.g., at particular intervals of time). Here, source device 205 may identify the set of files, associated with the application, based on the configuration information that identifies the application. Additionally, or alternatively, source device 205 may identify the file to be transferred in another manner, such as based on user input that identifies the file.

In some implementations, source device 205 may identify the file based on generating the file. For example, source device 205 may be configured to generate the file in accordance with the configuration information, as described above, for transfer to target device 215. Here, source device 205 may generate the file, and may identify the generated file as the file to be transferred from source device 205 to target device 215 based on generating the file.

Additionally, or alternatively, source device 205 may identify the file based on receiving the file. For example, source device 205 may receive the file from another device in accordance with the configuration information, as described above, for transfer to target device 215. Here, source device 205 may receive the file, and may and identify the received file as the file to be transferred from source device 205 to target device 215 based on receiving the file.

As further shown in FIG. 5, process 500 may include creating and storing a first feedback file, associated with tracking a status of the file transfer, based on identifying the file (step 510). For example, source device 205 may create and store a first feedback file, associated with the tracking a status of the file transfer, based on identifying the file for transfer. In some implementations, source device 205 may create and store the feedback file when source device 205 identifies the file for transfer from source device 205 to target device 215.

A feedback file may include a file that includes information associated with tracking the status of the file transfer. In some implementations, a set of feedback files may be used to determine status information associated with the file transfer, as described below with regard to FIG. 6. In some implementations, the feedback file may correspond to an event associated with the file transfer, such as an identification event (e.g., when the file is generated and identified for transfer, when the file is received and identified for transfer, etc.), a sent event (e.g., when the file is sent), a receipt event (e.g., when the file is received), a consumption event (e.g., when the file is consumed), or the like. As a particular example, the first feedback file may correspond to a generation event corresponding to a time at which the file is generated by source device 205 and/or identified for transfer by source device 205. Other examples of feedback files are described below. In some implementations, the feedback file feedback file may be included as part of a communication protocol, such as header information in a packet that contains information associated with the file being transferred.

In some implementations, the feedback file may include information that identifies the event that corresponds to the feedback file (e.g., generation, identification, sent, receipt, consumption, etc.). Additionally, or alternatively, the feedback file may include timing information associated with the event (i.e., a time at which the event takes place), such as a timestamp that identifies a date, a time, a time zone, or the like. Additionally, or alternatively, the feedback file may include information that identifies the file associated with the feedback file, information that identifies a host system associated with the file transfer, an application associated with the file transfer, information that identifies a device associated with the feedback file, or the like. In some implementations, devices associated with the file transfer (e.g., source device 205, intermediate devices 210, target device 215) may create a set of feedback files associated with the file transfer, as described below with regard to the remainder of example process 500. In some implementations, the feedback file may include an extensible markup language (XML) file or another type of file associated with formatting and/or sharing data.

In some implementations, source device 205 may create the first feedback file based on identifying the file for transfer from source device 205 to target device 215, such as when source device 205 generates the file. In other words, generation of the file may trigger source device 205 to create the first feedback file. For example, based on generating the file for transfer, source device 205 may create a first feedback file that includes information that identifies the event (e.g., generation), a timestamp associated with the event (e.g., 04-03-15 1:31:05 p.m. EST), information that identifies the file (e.g., test.dat), information that identifies source device 205 (e.g., an IP address), or the like.

In some implementations, source device 205 may store the first feedback file based on creating the first feedback file. For example, source device 205 may store the first feedback file such that the first feedback file may be provided to tracking server 225 for determination of status information associated with the file transfer, as described below. Additionally, or alternatively, source device 205 may provide (e.g., automatically, based on a request, etc.) the first feedback file to tracking server 225.

As further shown in FIG. 5, process 500 may include sending the file (step 515). For example, source device 205 may send the file to intermediate device 210. In some implementations, source device 205 may send the file after source device 205 identifies the file and/or creates the first feedback file.

In some implementations, source device 205 may send the based on the configuration information associated with the file transfer. For example, the configuration information associated with the file transfer may include information that identifies intermediate device 210 as a next device associated with the file transfer, information that identifies a host system associated with intermediate device 210 to which the file is to be provided, an application hosted by the host system to which the file is to be provided, a protocol associated with the file transfer, or the like, and may send the file, accordingly.

As further shown in FIG. 5, process 500 may include creating and storing a second feedback file, associated with tracking the status of the file transfer, based on sending the file (step 520). For example, source device 205 may create and store a second feedback file, associated with the tracking the status of the file transfer, based on sending the file. In some implementations, source device 205 may create and store the second feedback file when source device 205 sends the file to intermediate device 210.

In some implementations, source device 205 may create the second feedback file based on sending the file. For example, sending the file to intermediate device 210 may trigger source device 205 to create a second feedback file that includes information that identifies the event (e.g., sent), a timestamp associated with the event (e.g., 04-03-15 1:31:10 p.m. EST), the information that identifies the file, the information that identifies source device 205, or the like.

In some implementations, source device 205 may store the second feedback file based on creating the second feedback file. For example, source device 205 may store the second feedback file such that the second feedback file may be provided to tracking server 225 for determination of status information associated with the file transfer, as described below. Additionally, or alternatively, source device 205 may provide the second feedback file to tracking server 225.

As further shown in FIG. 5, process 500 may include creating and sending a third feedback file associated with tracking the status of the file transfer (step 525). For example, source device 205 may create and send a third feedback file associated with tracking the status of the file transfer. In some implementations, source device 205 may create and send the third feedback file after source device 205 sends the file to intermediate device 210. Additionally, or alternatively, source device 205 may create and send the third feedback file when source device 205 determines that the file has been received by intermediate device 210, as described below.

In some implementations, source device 205 may create the third feedback file based on determining the file has been received by intermediate device 210. In other words, acknowledgment of receipt of the file by intermediate device 210 may trigger source device 205 to create the third feedback file. For example, source device 205 may send the file to intermediate device 210, and may receive, from intermediate device 210, an acknowledgement that intermediate device 210 has received the file. Here, receiving the acknowledgment of receipt of the file may trigger source device 205 to create a third feedback file that includes information that identifies the event (e.g., receipt), a timestamp associated with the event (e.g., 04-03-15 1:31:15 p.m. EST), the information that identifies the file, information that identifies intermediate device 210 associated with the receipt event, or the like.

In some implementations, creating and sending the third feedback file by source device 205 (e.g., rather than creating of the third feedback file by intermediate device 210 based on receiving the file) may allow the status of the file transfer to be accurately tracked. For example, assume that intermediate device 210 is configured to create the third feedback file based on detecting receipt of the file from source device 205. Here, if intermediate device 210 receives the file and sends the file to a next device (e.g., another intermediate device 210 or target device 215) without storing the file and before detecting receipt of the file (i.e., before creation of the third feedback file would be triggered), then intermediate device 210 may not create the third feedback file. As such, the status of the file transfer, as determined by tracking server 225, may not accurately reflect that the file was received by intermediate device 210. Therefore, creation of the third feedback file by source device 205 may improve accuracy of the status information as determined by tracking server 225. However, in some implementations, intermediate device 210 may be configured to create the third feedback file (e.g., when detecting receipt of the file is ensured).

In some implementations, source device 205 may send the third feedback file to intermediate device 210 such that intermediate device 210 may store the third feedback file. In this way, intermediate device 210 may report receipt of the file to tracking server 225 (e.g., rather than source device 205). Additionally, or alternatively, source device 205 may send the third feedback file to tracking server 225. Additionally, or alternatively, source device 205 may store the third feedback file.

As further shown in FIG. 5, process 500 may include storing the third feedback file (step 530). For example, intermediate device 210 may store the third feedback file. In some implementations, intermediate device 210 may store the third feedback file after source device 205 sends the third feedback file to intermediate device 210.

In some implementations, intermediate device 210 may store the third feedback file such that intermediate device 210 may provide the third feedback file to tracking server 225 (e.g., at a later time). Additionally, or alternatively, intermediate device 210 may send the third feedback file to tracking server 225 for storage.

As further shown in FIG. 5, process 500 may include sending the file (step 535). For example, intermediate device 210 may send the file to target device 215 (e.g., as shown in FIG. 5). Additionally, or alternatively, intermediate device 210 may send the file to another intermediate device 210 (not shown). In some implementations, intermediate device 210 may send the file after source device 205 sends the file to intermediate device 210.

In some implementations, intermediate device 210 may send the file based on the configuration information associated with the file transfer. For example, the configuration information associated with the file transfer may include information that identifies target device 215 as a next device associated with the file transfer, information that identifies a host system associated with target device 215 to which the file is to be provided, an application hosted by the host system of target device 215 to which the file is to be provided, a protocol associated with the file transfer, a time or time period at which intermediate device 210 is to send the file to target device 215, or the like, and may send the file, accordingly.

As further shown in FIG. 5, process 500 may include creating and storing fourth feedback file, associated with tracking the status of the file transfer, based on sending the file (step 540). For example, intermediate device 210 may create and store a fourth feedback file, associated with tracking the status of the file transfer, based on sending the file to target device 215. In some implementations, intermediate device 210 may create and store the fourth feedback file when intermediate device 210 sends the file to intermediate device 210.

In some implementations, intermediate device 210 may create the fourth feedback file based on sending the file. For example, sending the file to intermediate device 210 may trigger intermediate device 210 to create a fourth feedback file that includes information that identifies the event (e.g., sent), a timestamp associated with the event (e.g., 04-03-15 1:31:20 p.m. EST), the information that identifies the file, the information that identifies intermediate device 210, or the like.

In some implementations, intermediate device 210 may store the fourth feedback file based on creating the fourth feedback file. For example, intermediate device 210 may store the fourth feedback file such that the fourth feedback file may be provided to tracking server 225 for determination of status information associated with the file transfer, as described below. Additionally, or alternatively, intermediate device 210 may provide the fourth feedback file to tracking server 225.

As further shown in FIG. 5, process 500 may include creating and sending a fifth feedback file associated with tracking the status of the file transfer (step 545). For example, intermediate device 210 may create and send a fifth feedback file associated with tracking the status of the file transfer. In some implementations, intermediate device 210 may create and send the fifth feedback file after intermediate device 210 sends the file to target device 215. Additionally, or alternatively, intermediate device 210 may create and send the fifth feedback file when intermediate device 210 determines that the file has been received by target device 215, as described below.

In some implementations, intermediate device 210 may create the fifth feedback file based on determining the file has been received by target device 215. In other words, acknowledgment of receipt of the file by target device 215 may trigger intermediate device 210 to create the fifth feedback file. For example, intermediate device 210 may send the file to intermediate device 210, and may receive, from target device 215, an acknowledgement that target device 215 has received the file. Here, receiving the acknowledgment of the receipt of the file may trigger intermediate device 210 to create a fifth feedback file that includes information that identifies the event (e.g., receipt), a timestamp associated with the event (e.g., 04-03-15 1:31:25 p.m. EST), the information that identifies the file, information that identifies target device 215, or the like.

In some implementations, creating and sending the fifth feedback file by intermediate device 210 (e.g., rather than creating of the fifth feedback file by target device 215 based on receiving the file) may allow the status of the file transfer to be accurately tracked for the reasons described above with regard to the third feedback file. However, in some implementations, target device 215 may be configured to create the fifth feedback file (e.g., when detecting receipt of the file is ensured).

In some implementations, intermediate device 210 may send the fifth feedback file to target device 215 such that target device 215 may store the fifth feedback file. In this way, target device 215 may report receipt of the file to tracking server 225 (e.g., rather than intermediate device 210). Additionally, or alternatively, intermediate device 210 may send the third feedback file to tracking server 225. Additionally, or alternatively, intermediate device 210 may store the fifth feedback file.

As further shown in FIG. 5, process 500 may include storing the fifth feedback file based on receiving the fifth feedback file (step 550). For example, target device 215 may store the fifth feedback file. In some implementations, target device 215 may store the third feedback file after intermediate device 210 sends the fifth feedback file to target device 215.

In some implementations, target device 215 may store the fifth feedback file such that target device 215 may provide the fifth feedback file to tracking server 225 (e.g., at a later time). Additionally, or alternatively, target device 215 may send the fifth feedback file to tracking server 225 for storage.

As further shown in FIG. 5, process 500 may include creating and storing a sixth feedback file associated with tracking the status of the file transfer (step 555). For example, target device 215 may create and store a sixth feedback file, associated with tracking the status of the file transfer. In some implementations, target device 215 may create and store the sixth feedback file when the file is consumed via target device 215.

In some implementations, target device 215 may create the sixth feedback file based on detecting that the file has been consumed (e.g., loaded, opened, stored, forwarded and/or otherwise provided by target device 215 for use in a host system, an application, etc.). For example, when target device 215 receives the file, target device 215 may provide the file for use in an application. Here, providing the file for use in the application may trigger target device 215 to create a sixth feedback file that includes information that identifies the event (e.g., consumption), a timestamp associated with the event (e.g., 04-03-15 1:31:30 p.m. EST), the information that identifies the file, the information that identifies target device 215, or the like.

In some implementations, target device 215 may store the sixth feedback file based on creating the sixth feedback file. For example, target device 215 may store the sixth feedback file such that the sixth feedback file may be provided to tracking server 225 for determination of status information associated with the file transfer, as described below. Additionally, or alternatively, target device 215 may provide the sixth feedback file to tracking server 225.

Although FIG. 5 shows example steps of process 500, in some implementations, process 500 may include additional steps, fewer steps, different steps, or differently arranged steps than those depicted in FIG. 5. Additionally, or alternatively, two or more of the steps of process 500 may be performed in parallel.

Notably, while example process 500 is associated with a file path that includes source device 205, a single intermediate device 210, and target device 215 (e.g., resulting in creation of six feedback files), other implementations are impossible. For example, the file path may include source device 205 and target device 215 only (e.g., resulting in creation of four feedback files). As another example, the file path may include source device 205, multiple intermediate devices 210, and target device 215 (e.g., resulting in creation of more than six feedback files).

Figure 6:
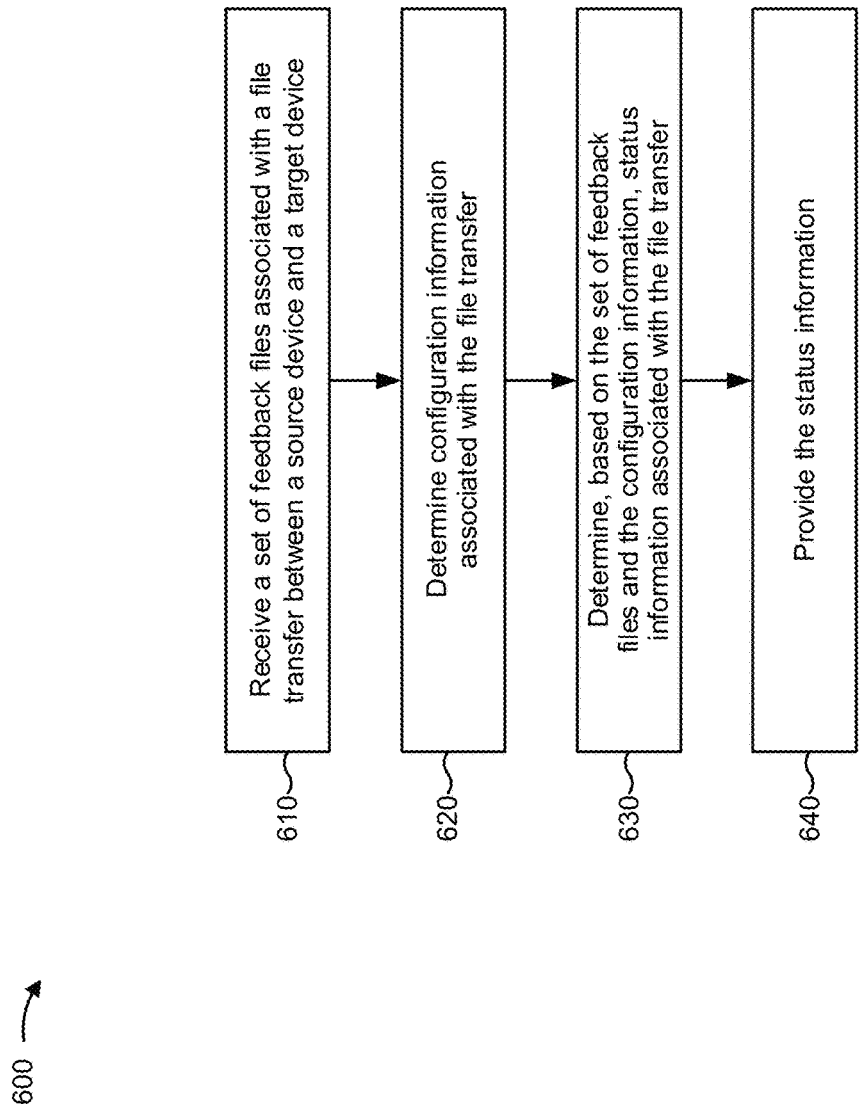
FIG. 6 is a flow chart of an example process for determining and providing status information associated with a file transfer from a source device to a target device.

FIG. 6 is a flow chart of an example process 600 for determining and providing status information associated with a file transfer from a source device to a target device. In some implementations, one or more process blocks of FIG. 6 may be performed by tracking server 225. In some implementations, one or more process blocks of FIG. 6 may be performed by another device or a group of devices separate from or including tracking server 225, such as user device 230 or another device of environment 200.

As shown in FIG. 6, process 600 may include receiving a set of feedback files associated with a file transfer from a source device to a target device (block 610). For example, tracking server 225 may receive a set of feedback files associated with a file transfer from source device 205 to target device 215. In some implementations, tracking server 225 may receive the set of feedback files when one or more other devices provide the set of feedback files, such as source device 205, intermediate device 210, and/or target device 215.

In some implementations, tracking server 225 may receive the feedback files based on a configuration of source device 205, intermediate device 210, and/or target device 215. For example, source device 205, intermediate device 210 and/or target device 215 may be configured to (e.g., automatically) provide the set of feedback files, such as at a particular time, at particular intervals of time, when each feedback file is created during the file transfer, when the file transfer is complete, when the file transfer has experienced an error, or the like. Here, tracking server 225 may receive the set of feedback files in accordance with the configuration of source device 205, intermediate device 210, and/or target device 215. In some implementations, tracking server 225 may receive the set of feedback files in real-time or near real-time during the file transfer. For example, each feedback file may be provided to tracking server 225 when created by source device 205, intermediate device 210, and/or target device 215.

Additionally, or alternatively, tracking server 225 may receive the feedback files based on a request to provide the feedback files. For example, tracking server 225 may (e.g., automatically, based on user input, etc.) provide, to source device 205, intermediate device 210 and/or target device 215, a request for the set of feedback files associated with the file transfer, and source device 205, intermediate device 210 and/or target device 215 may provide the feedback files in a response to the request.

In some implementations, the set of feedback files may correspond to a file transfer associated with one or more files, one or more groups of files, one or more applications (e.g., files associated with the one or more applications), one or more host systems (e.g., files associated with the one or more host systems), one or more devices, or the like.

As further shown in FIG. 6, process 600 may include determining configuration information associated with the file transfer (block 620). For example, tracking server 225 may determine configuration information associated with the file transfer. In some implementations, tracking server 225 may determine the configuration information when (e.g., before, after, concurrently with) tracking server 225 receives the set of feedback files. In some implementations, tracking server 225 may determine the configuration information based on receiving and storing the configuration information, as described above with regard to FIG. 4.

As further shown in FIG. 6, process 600 may include determining, based on the set of feedback files and the configuration information, status information associated with the file transfer (block 630). For example, tracking server 225 may determine, based on the set of feedback files and the configuration information, status information associated with the file transfer. In some implementations, tracking server 225 may determine the status information when tracking server 225 receives the feedback files. Additionally, or alternatively, tracking server 225 may determine the status information when tracking server 225 determines the configuration information associated with the file transfer. Additionally, or alternatively, tracking server 225 may determine the status information when tracking server 225 receives (e.g., automatically, based on user input, or the like) information indicating that tracking server 225 is to determine the status information, as described below.

The status information may include information associated with a status of the file transfer. For example, the status information may include information indicating that the file transfer has not started (e.g., that the file has not been generated), is waiting (e.g., that the file has been generated but not sent), is in-progress (e.g., that the file has been sent by source device 205 but not yet received by target device 215), is complete (e.g., that the file has been received by target device 215), has failed (e.g., when an event, associated with the file transfer, did not take place during an expected time window, when the file transfer has experienced an error, etc.).

In some implementations, tracking server 225 may determine the status information based on the set of feedback files, associated with the file transfer, and the configuration information associated with the file transfer. For example, tracking server 225 may store or have access to configuration information, associated with a file transfer, that identifies a file that is to be transferred from source device 205 to target device 215 (e.g., via intermediate device 210). Here, the configuration information may include information that identifies a file generation time window, a first file sent time window (e.g., associated with source device 205), a first file received time window (e.g., associated with intermediate device 210), a second file sent time window (e.g., associated with intermediate device 210), second file received time window (e.g., associated with target device 215), and a file consumption time window (e.g., associated with target device 215). In this example, assume that tracking server 225 receives a first feedback file that includes a first timestamp associated with generation of the file, and a second feedback file that includes a second timestamp associated with sending the file by source device 205. Here, tracking server 225 may compare the first timestamp to the file generation time window and the second timestamp to the first file sent time window. In this example, if the first and second timestamps fall within the first time window and the second time window, respectively, and the first file received time window has not passed, then tracking server 225 may determine that the file transfer is in progress. Alternatively, if the first file received time window has passed, then tracking server 225 may determine that the file transfer has failed (e.g., since the file was not received by intermediate device 210 in accordance with the configuration information).

In some implementations, tracking server 225 may determine, based on the set of feedback files, status information that identifies a point along the path where to which the file has progressed. For example, tracking server 225 may determine information that identifies a device to which the file transfer has progressed (e.g., source device 205, intermediate device 210, target device 215, etc.), a host system to which the file transfer has progressed, an application to which the file transfer has progressed, or the like.

In some implementations, tracking server 225 may determine status information associated with one or more files associated with a file transfer, such as multiple files in a group of files, multiple files associated with an application, multiple files associated with a host system, or the like.

In some implementations, tracking server 225 may determine the status information in real-time or near real-time (e.g., as tracking server 225 receives feedback files from source device 205, intermediate device 210, and target device 215). Additionally, or alternatively, tracking server 225 may determine the status information on a periodic basis (e.g., at a particular time, at particular intervals of time, etc.). Additionally, or alternatively, tracking server 225 may determine the status information based on user input. For example, a user may provide, via user device 230, user input indicating that tracking server 225 is to determine the status information, and tracking server 225 may determine the status information, accordingly.

As further shown in FIG. 6, process 600 may include providing the status information (block 640). For example, tracking server 225 may provide the status information. In some implementations, tracking server 225 may provide the status information when tracking server 225 determines the status information. Additionally, or alternatively, tracking server 225 may provide the status information when tracking server 225 receives (e.g., automatically, based on user input) an indication to provide the status information.

In some implementations, tracking server 225 may provide the status information for display to a user. For example, tracking server 225 may provide the status information to user device 230 such that user device may provide a user interface, associated with the status information, for display to the user. In some implementations, tracking server 225 may provide the status information based on the configuration information. For example, tracking server 225 may provide the status information for display to a user that is authorized (e.g., based on providing a username and password) to view the status information and/or user device 230 authorized to receive the status information.

In some implementations, user device 230 may receive the status information, and may provide the status information for display to the user, an example of which is described below with regard to FIGS. 7A and 7B.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
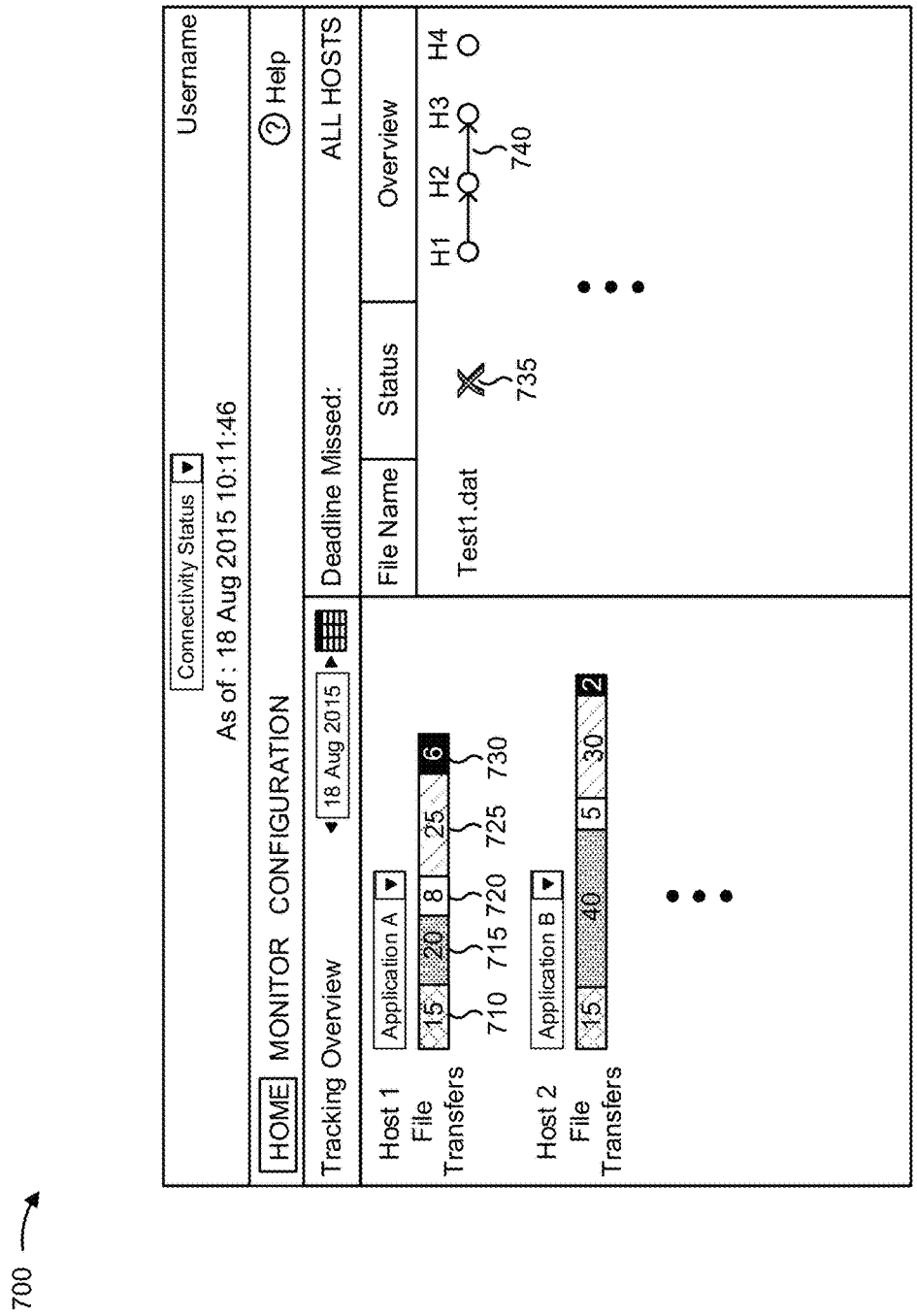
FIGS. 7A and 7B are diagrams of an example implementation relating to the example process shown in FIG. 6.
Figure 7B:
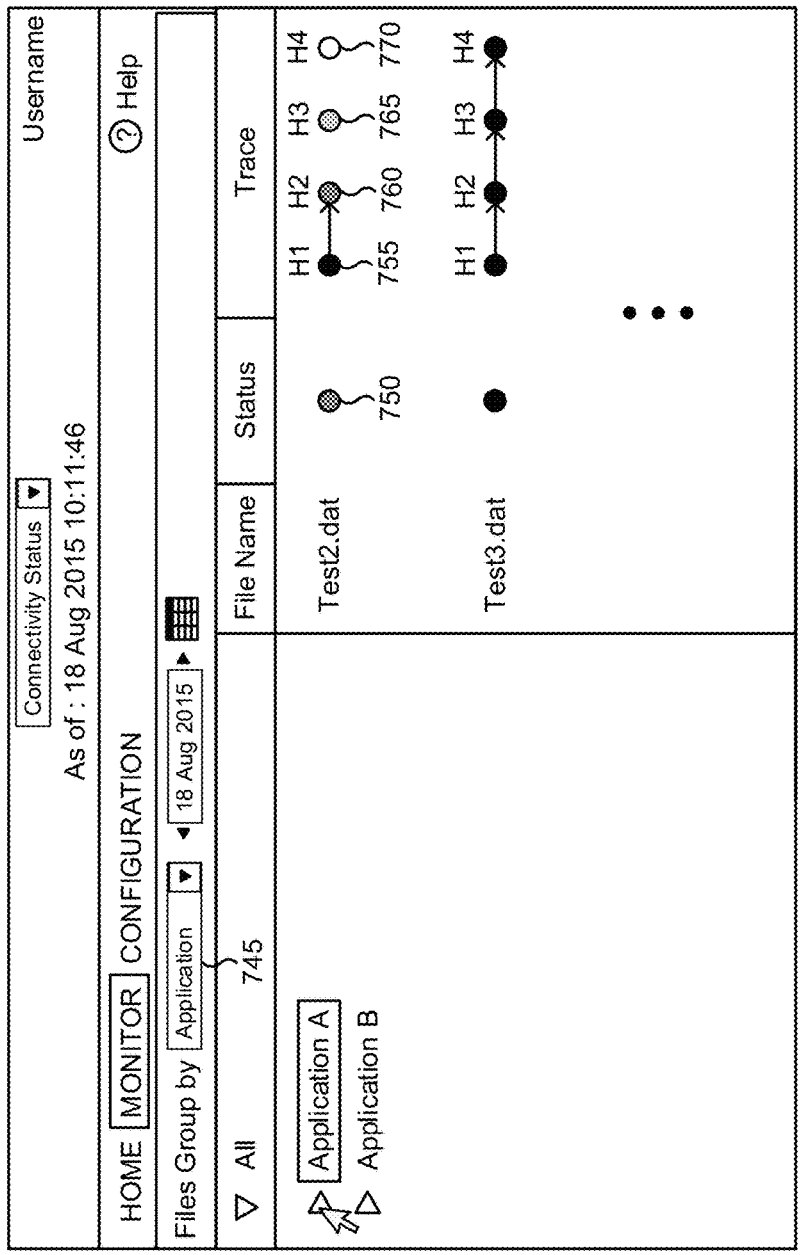

FIGS. 7A and 7B are diagrams of an example implementation 700 relating to example process 600 shown in FIG. 6. For the purposes of FIGS. 7A and 7B, assume that a host system on a first device (e.g., host 1 on source device 205) hosts a set of applications including a first application (e.g., application A), and that a host system on a second device (e.g., host 2 on intermediate device 210) hosts a set of applications including a second application (e.g., application B). Further, assume that configuration information, associated with source device 205, includes information corresponding to file transfers associated with application A on host 1, and that configuration information, associated with intermediate device 210, includes information corresponding to file transfers associated with application B on host 2.

As shown in FIG. 7A, a first user interface (e.g., a home user interface) may include status information associated with the host 1 and host 2 file transfers. As shown in the left portion of FIG. 7A, the user interface may include status information corresponding to the file transfers associated with application A on host 1. For example, the user interface may include information that identifies a number of application A file transfers that have not started (reference number 710), a number file transfers that are waiting (reference number 715), a number of file transfers that are in progress (reference number 720), a number of file transfer that have been completed (reference number 725), and a number of file transfers that have failed (reference number 730). As shown, the user interface may similarly include status information corresponding to the file transfers associated with application B on host 2. As further shown, the user interface may include an input element (e.g., a drop down menu) that allows the user to interact with the user interface in order to display status information for one or more applications associated with each host. In other words, the user may view the status information for a particular application, for a group of applications, or the like.

As shown in the right portion of FIG. 7A, the user interface may also include information that identifies file transfers that have failed (e.g., missed a deadline corresponding to a time window). For example, as shown by reference number 735, the user interface may include information that identifies a status of a file associated with a failed file transfer, such as a symbol, a colored dot, etc.). As shown by reference number 740, the user interface may also include a graphical representation (e.g., a set of connected or partially connected dots or symbols) that identifies a point at which the file transfer failed. For example, as shown in FIG. 7A, the partially connected dots associated with Test1.dat may indicate that the file transfer failed (e.g., missed a deadline associated with a time window) at a host system on a third device (e.g., host 3 on another intermediate device 210).

As shown in FIG. 7B, a second user interface (e.g., a monitor user interface) may include detailed status information associated with the application A and application B file transfers. As indicated by reference number 745, in some implementations, the user interface may include an input element that allows the user to choose to view the status information on a per application basis, a per host basis, or the like.

As shown in the left portion of FIG. 7B, assume that the use has selected (e.g., by selecting an arrow) to view status information associated with application A. As shown in the right portion of FIG. 7B, the user interface may include detailed status information associated with each file transfer associated with application A. For example, the user interface may include an overall status indicator indicating that a first file transfer (e.g., associated with Test2.dat) is in progress (reference number 750), a first host indicator indicating that the file has been generated and sent by the first host (reference number 755), a second host indicator indicating that the file has been received at the second host but not yet sent to a third host (reference number 760), a third status indicator indication that the third host is expecting the file (i.e., that a time window associated with receiving the file has started, but not passed) (reference number 765), and a fourth host indication indicating that the fourth host is not yet expecting the file (i.e., that a time window associated with receiving the file has not started) (reference number 770). As shown, the user interface may include status information associated with one or more other files associated with application A, such as a set of indicators indicating the another file transfer (e.g., associated with Test3.dat) is complete.

In some implementations, user device 230 and/or tracking server 225 may perform real-time monitoring of communications and can be configured to present information to the user (e.g., by updating the user interfaces associated with the file transfer) in ways that may improve the user's comprehension of the status of the file transfer. This may allow the user to react to occurrences (e.g., issues, problems, etc.), associated with the file transfer, that were not previously known and/or that were difficult to identify and/or understand.

As indicated above, FIGS. 7A and 7B are provided merely as examples. Other examples are possible and may differ from what was described with regard to FIGS. 7A and 7B.

Implementations described herein may allow a tracking server to determine a status of a file transfer (e.g., across multiple devices) using a set of feedback files, corresponding to each file associated with the file transfer, that are automatically (e.g., without user intervention) created during the file transfer. In some implementations, use of the feedback files may allow the tracking server to determine the status of the file transfer automatically and/or in real-time (or near real-time) during the file transfer.

Implementations described herein may also allow the tracking server to provide information associated with the status of the file transfer such that the status information is accessible even when the multiple devices via which the file transfer occurs are operated and/or managed by separate entities.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a set of feedback files for determining a status of a file transfer, from a first device to a second device via an intermediate device, automatically and/or in real-time during the file transfer,
   the set of feedback files including:
      a first feedback file including a first timestamp corresponding to a generation of a file associated with the file transfer,
      a second feedback file including a second timestamp corresponding to a sending of the file from the first device to the intermediate device,
      a third feedback file including a third timestamp corresponding to a receipt of the file at the intermediate device,
      a fourth feedback file including a fourth timestamp corresponding to a sending of the file from the intermediate device, and a fifth feedback file including a fifth timestamp corresponding to a receipt of the file at the second device;
determining, by the device, configuration information associated with the file transfer,
the configuration information including information that identifies:
a file generation time window,
a first file sent time window,
a second file sent time window,
a first file receipt time window, and
a second file receipt time window;
comparing, by the device, the first timestamp and the file generation time window;
comparing, by the device, the second timestamp and the first file sent time window;
comparing, by the device, the third timestamp and the first file receipt time window;
comparing, by the device, the fourth timestamp and the second file sent time window;
comparing, by the device, the fifth timestamp and the second file receipt time window;
determining, by the device, status information associated with the status of the file transfer,
the status information being determined based on:
comparing the first timestamp and the file generation time window,
comparing the second timestamp and the first file sent time window,
comparing the third timestamp and the first file receipt time window,
comparing the fourth timestamp and the second file sent time window, and
comparing the fifth timestamp and the second file receipt time window;
determining, by the device and based on the status information, location information indicating a location, along a path of the file transfer, to which the file has progressed,
the location information enabling the device to locate, in real-time, the file along the path of the file transfer; and
providing, by the device and to a user device for display, the status information.

2. The method of claim 1, where the second device is a target device, and the set of feedback files includes:
a sixth feedback file associated with loading, opening, or storing the file by the second device.

3. The method of claim 1, further comprising:
determining that a time, identified by a consumption timestamp, is within a file consumption time window; and
where determining the status information comprises:
determining status information indicating that the file transfer is complete based on determining that the time is within the file consumption time window.

4. The method of claim 1, where receiving the set of feedback files comprises:
receiving the first feedback file from the first device,
the first feedback file being created by the first device; and
receiving the second feedback file from the first device,
the second feedback file being created by the first device.

5. The method of claim 1, where the configuration information further comprises:
a file consumption time window information.

6. The method of claim 1, where the configuration information further comprises:
information that identifies a set of files associated with the file transfer from the first device to the second device, the information including at least one of:
names of one or more files in the set of files,
a name of a group of files in the set of files, or
a list of file names in the set of files.

7. A device, comprising:
a memory; and
one or more processors to:
receive a plurality of feedback files for determining a status of a file transfer, from a first device to a second device via an intermediate device, automatically and/or in real-time during the file transfer,
the plurality of feedback files including:
a first feedback file including a first timestamp corresponding to a generation of a file associated with the file transfer,
a second feedback file including a second timestamp corresponding to a sending of the file from the first device to the intermediate device,
a third feedback file including a third timestamp corresponding to a receipt of the file at the intermediate device,
a fourth feedback file including a fourth timestamp corresponding to a sending of the file from the intermediate device, and
a fifth feedback file including a fifth timestamp corresponding to a receipt of the file at the second device;
receive configuration information associated with the file transfer,
the configuration information including information that identifies:
a file generation time window,
a first file sent time window,
a second file sent time window,
a first file receipt time window, and
a second file receipt time window;
compare the first timestamp and the file generation time window;
compare the second timestamp and the first file sent time window;
compare the third timestamp and the first file receipt time window;
compare the fourth timestamp and the second file sent time window;
compare the fifth timestamp and the second file receipt time window;
determine the status of the file transfer based on:
comparing the first timestamp and the file generation time window,
comparing the second timestamp and the first file sent time window;
comparing the third timestamp and the first file receipt time window;
comparing the fourth timestamp and the second file sent time window;
comparing the fifth timestamp and the second file receipt time window;
determine, based on the status of the file transfer, location information indicating a location, along a path of the file transfer, to which the file has progressed, the location information enabling the device to locate, in real-time, the file along the path of the file transfer; and provide, to a user device for display, information associated with the status of the file transfer.

8. The device of claim 7, where the second device is a target device, and the plurality of feedback files includes:
a sixth feedback file associated with providing the file for loading, opening, or storing by the target device.

9. The device of claim 7, where the one or more processors are further to:
determine that a time, identified by the second timestamp, is not within the file sent time window; and
where the one or more processors, when determining the status of the file transfer, are to:
determine the status of the file transfer based on determining that the time, identified by the second timestamp, is not within the file sent time window.

10. The device of claim 7, where the first device and the second device are operated or managed by separate entities.

11. The device of claim 7, where the one or more processors, when receiving the plurality of feedback files, are to:
receive the first feedback file from the first device,
the first feedback file being created by the first device; and
receive the second feedback file from the first device,
the second feedback file being received after the first feedback file is received, and
the second feedback file being created by the first device.

12. The device of claim 7, where the configuration information further comprises:
an application identifier associated with a set of files transferred from the first device to the second device.

13. The device of claim 7, where the user device is not associated with operating or managing the first device, the intermediate device, or the second device.

14. A non-transitory computer-readable medium storing instructions, the instructions comprising:
one or more instructions that, when executed by one or more processors a device, cause the one or more processors to:
receive, from a first device, a set of feedback files for determining a status of a file transfer, from the first device to a second device via an intermediate device, automatically and/or in real-time during the file transfer,
the set of feedback files including:
a first feedback file identifying a first time associated with a generation of a file associated with the file transfer,
a second feedback file identifying a second time associated with a sending of the file from the first device to the intermediate device,
a third feedback file identifying a third time associated with a receipt of the file at the intermediate device,
a fourth feedback file identifying a fourth time associated with a sending of the file from the intermediate device, and
a fifth feedback file identifying a fifth time associated with a receipt of the file at the second device;
determine configuration information, associated with the file transfer, that includes:
a file generation time window,
a first file sent time window,
a second file sent time window,
a first file receipt time window, and
a second file receipt time window;
compare the first time and the file generation time window;
compare the second time and the first file sent time window;
compare the third time and the first file receipt time window;
compare the fourth time and the second file sent time window;
compare the fifth time and the second file receipt time window,
determine status information associated with the status of the file transfer,
the status information being determined based on:
comparing the first time and the file generation time window,
comparing the second time and the file sent time window,
comparing the third time and the first file receipt time window,
comparing the fourth time and the second file sent time window, and
comparing the fifth time and the second file receipt time window;
determine, based on the status information, location information indicating a location, along a path of the file transfer, to which the file has progressed,
the location information enabling the device to locate, in real-time, the file along the path of the file transfer; and
provide, to a user device, the status information for display to a user.

15. The non-transitory computer-readable medium of claim 14, where the one or more instructions, when executed by the one or more processors, further cause the one or more processors to:
determine that the second time is within the file sent time window; and
where the one or more instructions, that cause the one or more processors to determine the status information, cause the one or more processors to:
determine the status information indicating that the file transfer is in-progress based on determining that the second time is within the file sent time window.

16. The method of claim 5, where the file consumption time window information comprises:
a schedule based on which the file is to be at least one of:
loaded,
opened,
stored, or
forwarded.

17. The non-transitory computer-readable medium of claim 14, where the configuration information further comprises:
information that identifies the path.

18. The non-transitory computer-readable medium of claim 14, where the configuration information further comprises at least one of:
a device identifier associated with the first device; or
a network address associated with the first device.

19. The non-transitory computer-readable medium of claim 14, where the configuration information further comprises:

a host system identifier associated with a set of files transferred from the first device to the second device.

20. The non-transitory computer-readable medium of claim 14, where the one or more instructions, when executed by the one or more processors, further cause the one or more processors to:

determine, based on the status information, whether the file is dropped, lost, or misrouted.

* * * * *